(12) United States Patent
Lih (10) Patent No.: US 9,110,825 B2
(45) Date of Patent: Aug. 18, 2015

(54) UNCACHED STATIC SHORT ADDRESS TRANSLATION TABLE IN THE CACHE COHERENT COMPUTER SYSTEM

(71) Applicant: Futurewei Technologies, Inc., Plano, TX (US)

(72) Inventor: Iulin Lih, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 244 days.

(21) Appl. No.: 13/667,440

(22) Filed: Nov. 2, 2012

(65) Prior Publication Data

US 2013/0111167 A1    May 2, 2013

Related U.S. Application Data

(60) Provisional application No. 61/554,742, filed on Nov. 2, 2011.

(51) Int. Cl.
*G06F 12/00* (2006.01)
*G06F 12/10* (2006.01)

(52) U.S. Cl.
CPC .......... *G06F 12/1009* (2013.01); *G06F 12/109* (2013.01); *G06F 12/1063* (2013.01)

(58) Field of Classification Search
None
See application file for complete search history.

(56) References Cited

U.S. PATENT DOCUMENTS

| | | | |
|---|---|---|---|
| 4,654,791 A | 3/1987 | Ushiro | |
| 5,043,871 A * | 8/1991 | Nishigaki et al. | 1/1 |
| 5,053,951 A * | 10/1991 | Nusinov et al. | 711/206 |
| 5,564,052 A * | 10/1996 | Nguyen et al. | 712/42 |
| 5,724,581 A * | 3/1998 | Kozakura | 707/674 |
| 6,119,214 A * | 9/2000 | Dirks | 711/206 |
| 6,763,452 B1 | 7/2004 | Hohensee et al. | |
| 6,766,435 B1 * | 7/2004 | Aglietti et al. | 711/209 |
| 6,779,107 B1 | 8/2004 | Yates | |
| 6,789,181 B1 | 9/2004 | Yates et al. | |
| 6,826,748 B1 | 11/2004 | Hohensee et al. | |
| 6,854,046 B1 * | 2/2005 | Evans et al. | 711/203 |
| 6,934,832 B1 | 8/2005 | Van Dyke et al. | |
| 6,941,545 B1 | 9/2005 | Reese et al. | |
| 6,954,923 B1 | 10/2005 | Yates, Jr. et al. | |
| 7,013,456 B1 | 3/2006 | Van Dyke et al. | |
| 7,047,394 B1 | 5/2006 | Van Dyke et al. | |
| 7,065,633 B1 | 6/2006 | Yates, Jr. et al. | |
| 7,069,421 B1 | 6/2006 | Yates, Jr. et al. | |
| 7,111,290 B1 | 9/2006 | Yates, Jr. et al. | |
| 7,137,110 B1 | 11/2006 | Reese et al. | |

(Continued)

OTHER PUBLICATIONS

Foreign Communication From a Counterpart Application, PCT Application PCT/US2012/063357, International Search Report, dated Mar. 7, 2013, 4 pages.

(Continued)

*Primary Examiner* — Reginald Bragdon
*Assistant Examiner* — Michael Westbrook
(74) *Attorney, Agent, or Firm* — Conley Rose, P.C.; Grant Rodolph; Brandt D. Howell (57) ABSTRACT

A network unit, comprising a processor and a random access memory (RAM) component coupled to the processor, wherein the RAM component comprises a memory management unit (MMU) and a data RAM, wherein the MMU comprises a complete page address table for translating a virtual memory address received from the processor into a physical memory address, and wherein the complete page address table is substantially static.

22 Claims, 5 Drawing Sheets

(56) References Cited

U.S. PATENT DOCUMENTS

| | | |
|---|---|---|
| 7,146,477 B1 * | 12/2006 | Strongin et al. .............. 711/163 |
| 7,228,404 B1 | 6/2007 | Patel et al. |
| 7,254,806 B1 | 8/2007 | Yates, Jr. et al. |
| 7,275,246 B1 | 9/2007 | Yates, Jr. et al. |
| 7,343,469 B1 * | 3/2008 | Bogin et al. ................... 711/209 |
| 7,461,232 B2 * | 12/2008 | Nicolai .......................... 711/207 |
| 7,676,645 B2 * | 3/2010 | Hsu et al. ...................... 711/203 |
| 7,822,941 B2 * | 10/2010 | Vick et al. ..................... 711/203 |
| 7,941,647 B2 | 5/2011 | Yates, Jr. et al. |
| 8,065,504 B2 | 11/2011 | Yates, Jr. et al. |
| 8,074,055 B1 | 12/2011 | Yates, Jr. et al. |
| 8,121,828 B2 | 2/2012 | Yates, Jr. et al. |
| 8,127,121 B2 | 2/2012 | Yates, Jr. et al. |
| 8,386,747 B2 * | 2/2013 | Moyer et al. ................... 711/207 |
| 2003/0204702 A1 * | 10/2003 | Lomax et al. .................. 711/207 |
| 2007/0055843 A1 | 3/2007 | Lameter |
| 2007/0067590 A1 * | 3/2007 | Savagaonkar et al. ........ 711/163 |
| 2007/0079106 A1 * | 4/2007 | Davis ............................. 711/203 |
| 2007/0198806 A1 * | 8/2007 | Schultz ........................... 711/203 |
| 2013/0246728 A1 * | 9/2013 | Nishiguchi ..................... 711/163 |

OTHER PUBLICATIONS

Foreign Communication From a Counterpart Application, PCT Application PCT/US2012/063357, Written Opinion dated dated Mar. 7, 2013, 8 pages.

\* cited by examiner

UNCACHED STATIC SHORT ADDRESS TRANSLATION TABLE IN THE CACHE COHERENT COMPUTER SYSTEM

CROSS-REFERENCE TO RELATED APPLICATIONS

The present application claims the benefit of U.S. Provisional Patent Application No. 61/554,742 filed Nov. 2, 2011 by Yolin Lih and entitled "Uncacheable Short Address Translation Table in the Cache Coherent Computer System," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A memory management unit (MMU) is a component responsible for handling accesses to memory requested by the central processing unit (CPU) in a data processing system. The MMU is usually resident in the random access memory (RAM) portion of the data processing system. The CPU provides the MMU with a virtual memory address when requesting data from the memory. The MMU is responsible for translating the virtual memory address into a physical memory address corresponding to the actual physical memory location. To do this, the MMU usually consults a cached translation lookaside buffer (TLB). The TLB is a subset of a complete page address table and may change over time. The complete address table usually resides in the main memory. Because the TLB may change over time, a cache coherence problem may arise in multi-processor systems with multiple MMUs since each MMU may have its own TLB and the TLBs may not comprise the same entries. Furthermore, because the TLB comprises only a subset of the complete page address table, some memory requests from the CPU may result in a cache miss. In such cases, the MMU must then consult the complete page address table which increases latency.

Additionally, the MMU may be responsible for page protection of the data in the RAM to prevent or deny access to the data if the privilege level of the request from the CPU is not sufficiently high. This prevents unauthorized reading and/or modification of the data in the RAM. The page translation table, in addition to containing entries translating virtual addresses to physical addresses, may also contain a privilege levels that may be associated with each virtual address. The TLB may contain a subset of virtual address and privilege level correlations. The MMU may check the TLB to determine the privilege required to access the data associated with the virtual address. However, the since the TLB does not include the entire page translation table, there is a chance that the MMU will not be able to determine whether the data request is authorized without additionally consulting the complete translation table. If this is necessary, the time to determine whether the data request is authorized may be increased. Furthermore, as with address translation, the cache coherence problem of the TLB may also compromise the ability of the MMU to perform its page protection mechanisms.

SUMMARY

In one example embodiment, the disclosure includes a network unit, comprising a processor and a RAM component coupled to the processor, wherein the RAM component comprises a MMU and a data RAM, wherein the MMU comprises a complete page address table for translating a virtual memory address received from the processor into a physical memory address, and wherein the complete page address table is substantially static.

In another example embodiment, the disclosure includes a method for reading data from a RAM, comprising receiving, at a MMU, a memory access command from a processor, wherein the memory access command comprises a virtual memory address, and translating, at the MMU, at least a first portion of the virtual memory address into a first portion of a physical memory address by consulting a complete translation table contained within the RAM, wherein the complete translation table comprises substantially static entries.

In another example embodiment, the disclosure includes a RAM component in a data processing system, comprising a MMU and a complete chapter address table coupled to the MMU, wherein the MMU is configured to translate a virtual memory address into a physical memory address by consulting the complete chapter address table, and wherein the complete chapter address table is uncached and substantially static.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a variable page size page address table (also referred to as a chapter address table) that may be implemented entirely within hardware, such as RAM in a data processing system. In an embodiment, the disclosed chapter address table may be static or quasi-static, and thus may not change over time (e.g., the chapter address table may not change during the run-time). The disclosed chapter address table may be implemented in a MMU with simple RAM without a content addressable memory (CAM) and without extra comparators. The disclosed chapter address table and scheme may provide a reduced latency as compared with traditional page address tables implemented with the use of cached TLBs. The disclosed chapter address table and schemes may also avoid the coherency issues often encountered by traditional page address table schemes using cached TLBs because the disclosed chapter address table may be static or quasi-static. The MMU may only need to change the chapter address table if the contents of the table become corrupted. In such case, the MMU may obtain a correct copy of the chapter address table from another MMU within the data processing system.

Figure 1:
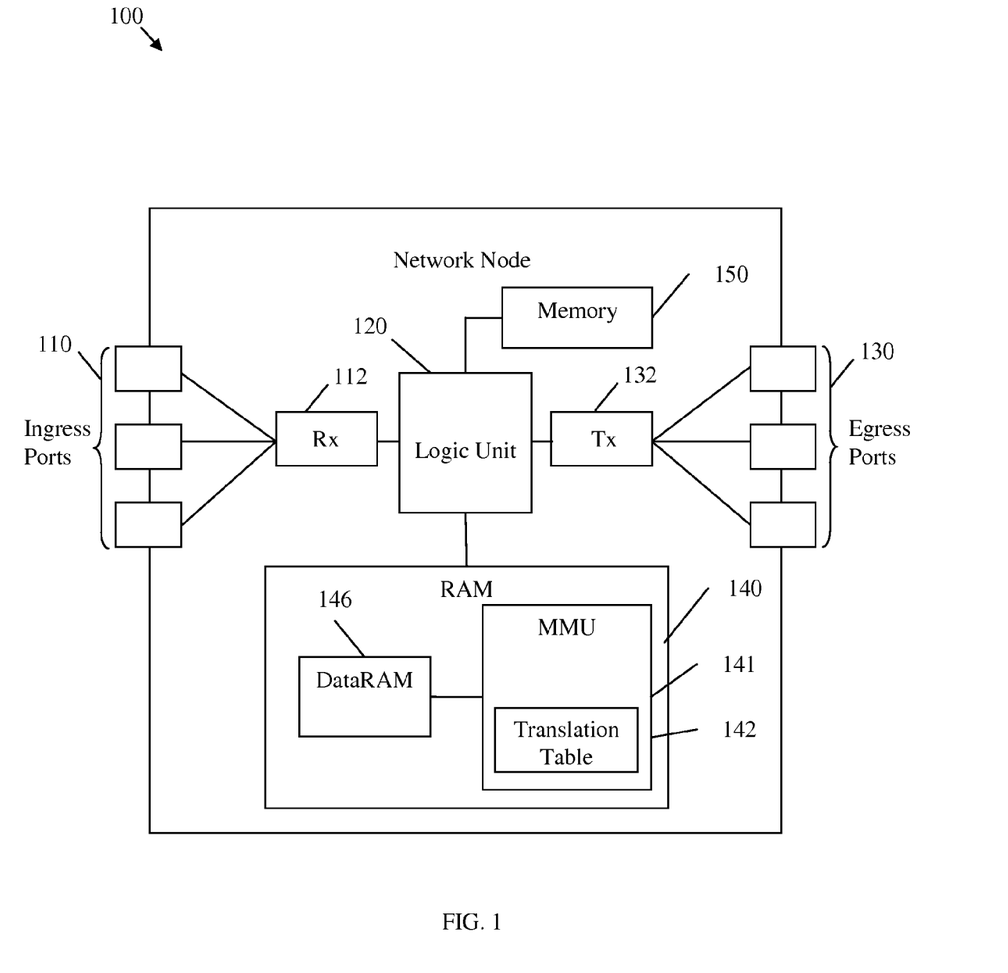
FIG. 1 is a schematic diagram that illustrates an example embodiment of a network unit, which may be any device that transports and processes data through the network.

FIG. 1 illustrates an example embodiment of a network node 100, which may be any device that transports and processes data through the network. For instance, the network node 100 may implement the uncached variable page size complete short page address translation table scheme 400, method 500, and method 600 described below. The network node 100 may comprise one or more ingress ports or units 110 coupled to a receiver (Rx) 112 for receiving signals and frames/data from other network components. The network node 100 may comprise a logic unit 120 to determine which network components to send data to. The logic unit 120 may be implemented using hardware, software, or both. The logic unit 120 may be implemented as one or more central processing unit (CPU) chips, or may be part of one or more application-specific integrated circuits (ASICs) or digital signal processors (DSPs), or may be implemented as part of multi-processor cluster. The logic unit 120 may comprise one or more processors and one or more of the processors may be multi-core processors. The network node 100 may also comprise one or more egress ports or units 130 coupled to a transmitter (Tx) 132 for transmitting signals and frames/data to the other network components. The network node 100 may comprise a memory unit 150 coupled to the logic unit 120. The memory unit 150 may store a routing table and/or other data for the network node 100. The network node 100 may comprise a RAM component 140 coupled to the logic unit 120. The RAM component 140 may comprise an MMU 141 and a DataRAM 146. The MMU 141 may be configured to manage the DataRAM 146. MMU 141 may comprise an address translation table 142. Address translation table 142 may comprise entries that map virtual addresses to physical addresses. DataRAM 146 may also store the routing table that may comprise the routes to other network destinations. MMU 141 may implement the uncached variable page size complete page address translation table 300, method 500, and method 600 described above. The components of the network node 100 may be arranged as shown in FIG. 1.

Figure 2:
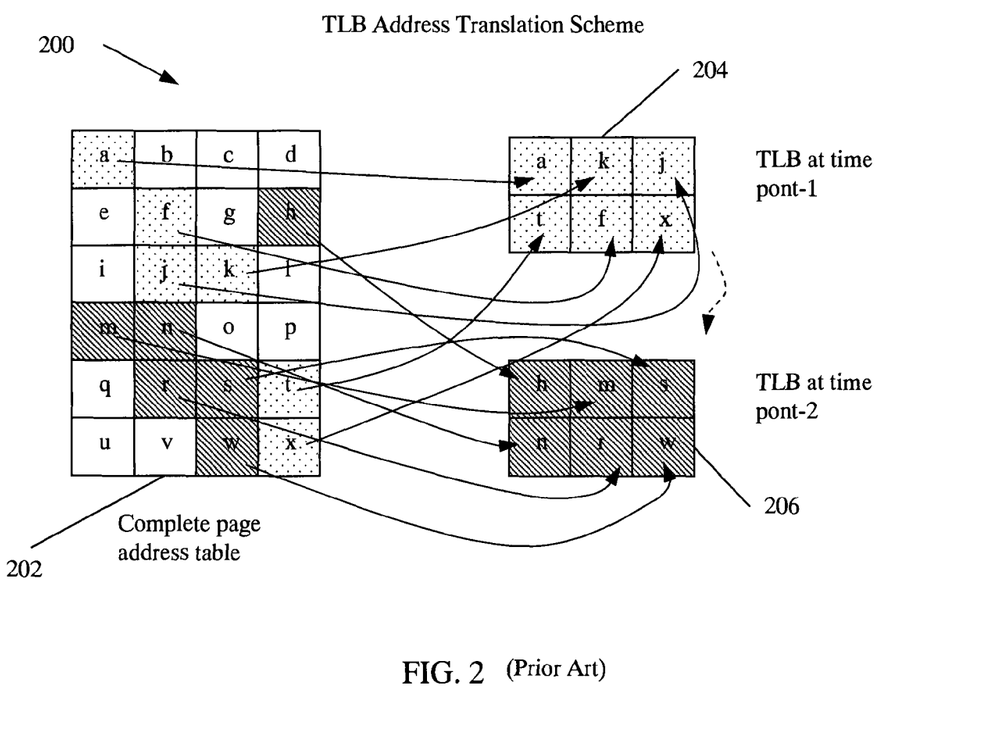
FIG. 2 is a schematic diagram illustrating a scheme for virtual address to physical address translation using a TLB.

FIG. 2 is a schematic diagram illustrating a traditional scheme 200 for virtual address to physical address translation using a TLB. Scheme 200 may comprise a complete page address table 202 and a TLB. The diagram shows the TLB 204 at a time point-1 and the TLB 206 at a time point-2. The complete address table 202 may usually reside in the hard disk or other storage of a computer. The TLB comprises a portion of the complete address table and may typically reside in the DRAM of the computer. The lightly shaded boxes in the complete page address table 202 correspond to the addresses that are copied into the TLB 204 at the time point-1. The darker shaded boxes in the complete page address table 202 correspond to the addresses that are copied into the TLB 206 at time point-2. The unshaded boxes in the complete page address table 202 correspond to the addresses that have not been copied into the TLB at either time point-1 or timepoint-2. These addresses may be copied into the TLB at some other time. The page address table 202 may comprise entries that translate the virtual (or logical) memory addresses to the physical memory address in a memory. The page address table 202 may be stored in a main memory in a network component. The TLB 204, 206 may be stored in the main memory of the network component or in RAM of the network component. The TLB 204, 206 may also be stored in or reside in a MMU. The mapping of the virtual addresses to the physical addresses may be in the form of:

Virtual_Address[V:0]->Physical_Address [P:0], where V+1 bits is the width of the virtual address and P+1 bits is the width of the physical address, and where the width of the virtual address and the width of the physical address may be different. Typically, the page size for each page in the page address table 202 may be a constant uniform size. Because each page is the same size, the page address table 202 may be too large to be implemented in the RAM (e.g., in order to accommodate 64 bit virtual addresses).

The TLB 204, 206 may be a cache of a subset of the page address table 202 at a given time point and may not contain the entire page address table 202. The TLB 204, 206 may change over time depending on the requests for data from a processor. For example, at time point-1, the TLB 204 may comprise entries a, k, j, t, f, and x from the page address table 202. At time point-2, the TLB 204 may change to TLB 206 and may comprise entries h, m, s, n, r, and w from the page address table 202. The TLB 204, 206 may be implemented with a fully associated CAM or as a set associated RAM with comparators. Both implementations for the TLB may have a high hardware cost and may have a high latency. In a data processing system with multiple MMUs, the time changing nature of the TLB 204, 206 may cause TLB coherence issues. A coherence issue may be a situation in which the cached TLB in one MMU comprises different data from the cached TLB in a different MMU. Means for addressing TLB coherency problems may require sophisticated hardware and software handling and may even require dedicated supporting instructions be defined.

Another problem with scheme 200 may be the potential for a cache miss. The TLB 204, 206 may cause a cache miss when the virtual address is not contained in the TLB 204, 206. In such a case, the requested data associated with the virtual address may be read from the page address table 202 rather than from the TLB 204, 206. However, accessing the page address table 202 may result in a longer latency in retrieving the requested data than would be the case if the mapping of the virtual address to the physical address had been performed with the TLB. A cache miss may cause other problems as well. For example, a cache miss on an instruction fetch for a processor may cause the processor to stall or wait until the instruction is available from main memory. In some cases, a cache miss may cause an application to quit functioning.

Figure 3:
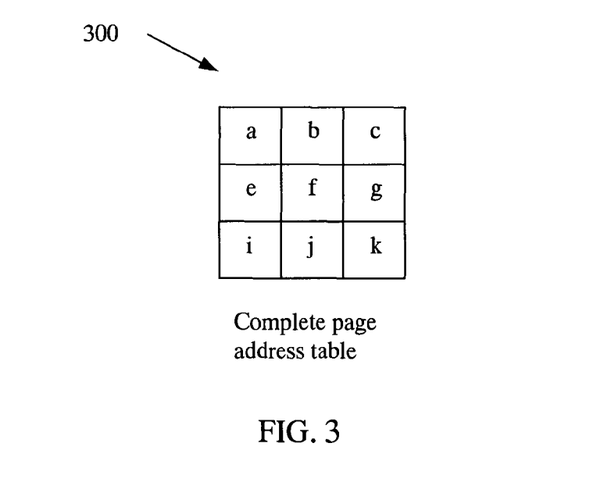
FIG. 3 shows a diagram of a complete page address table implementable within an MMU in accordance with an embodiment of the disclosure.

FIG. 3 shows a diagram of a complete page address table 300 implementable within an MMU in accordance with an embodiment of the disclosure. The page address table 300 may be implemented as the page address table 142 in FIG. 1. The page address table 300 may be similar to the page address table 202, but may be smaller in size and be implemented entirely within the RAM or MMU of a data processing system. The page address table 300 may comprise entries such that only a "short" section of the memory (page) address is translated from the virtual address to the physical address. The "short" section of the memory (page) address comprises less than all of the entire memory (page) address for the page. The remaining part of the memory page address and the memory page index may be the same in both the virtual address space and the physical address space. The page address table 300 may comprise variable sized pages rather than pages in which all of the pages are the same size. For example, one page may be 16 kilobytes (kB) in size while another page may be one megabyte (MB) in size. The variable sized pages may be referred to as chapters, and the page address table 300 may be referred to as a chapter address table to distinguish the page address table 300 from uniform sized page address tables, such as page address table 202. The page address table 300 may be implemented with simple RAM with no need for a CAM or extra comparators.

The page address table 300 may be implemented with a set of restricted translation rules:
Virtual_Address[V:U]=Physical_Address [V:U],
Virtual_Address[W:0]=Physical_Address [W:0],
Virtual_Address[U−1:W+1]->Physical_Address [U−1:W+1].

In this embodiment, the first line of the rules indicates that the upper bits of the virtual address may not be translated. The second line of the rules indicates that the lower bits of the virtual address may not be translated. The third line of the rules indicates that some middle portion of the virtual address, W+1 to U−1, may be translated into a physical address of the same width. In other embodiments, other restricted translation rules may be applied such that, for example, a subset of lower bits of the virtual address may be translated and the middle and upper bits of the virtual address are not translated. In another embodiment, the restricted translation rules may provide that the upper bits of the virtual address may be translated into a physical address, but the lower and middle bits of the virtual address are not translated.

Thus, the translatable address bits are limited so that the mapping table for the virtual address to the physical address is small enough that the page address table 300 may reside in the MMU. In another embodiment, the translation rules may provide that a virtual address in the form of (x,y) where x is the first portion of the virtual address and y is the remaining portion of the virtual address transforms to a physical address in the form of (z,y) where z is the first part of the physical address and y is the remaining part of the physical address and y remains the same in both the virtual address and the physical address. Thus, only x->z is translated using the page address table 300. The size of the page address table 300 may vary depending on implementation specific parameters, such as the size of the RAM in a data processing system. In some embodiments, if the length of the virtual address is short enough, the entire virtual address may be translated to a physical address with the page address table 300.

In an embodiment, the entries in the page address table 300 may comprise both the address and the corresponding data. In an embodiment, the entries in the page address table 300 may comprise a built in compare. Data processing systems utilizing the disclosed page address table 300 may be free of cache coherence issues or problems because the page address table 300 may be static or quasi static (i.e., not changing substantially over time). Traditionally, the content in the TLB (e.g., TLB 204 or TLB 206) may depend on the job it is handling. When a processor or an MMU domain is switching jobs, the processor or MMU may need to replace the TLB content dynamically. This may happen in a non-synchronized manner. Thus, static or quasi static, as used herein means that the page address table 300 may not change at all or may change at configuration (e.g., after the completion of a job), such that all of the MMUs may coordinate (synchronize) their changes in a predictable manner at the same time. Therefore, the page address table 300 does not change dynamically in an unpredictable unsynchronized manner during a job (as may happen with the TLB 204, 206).

Figure 4:
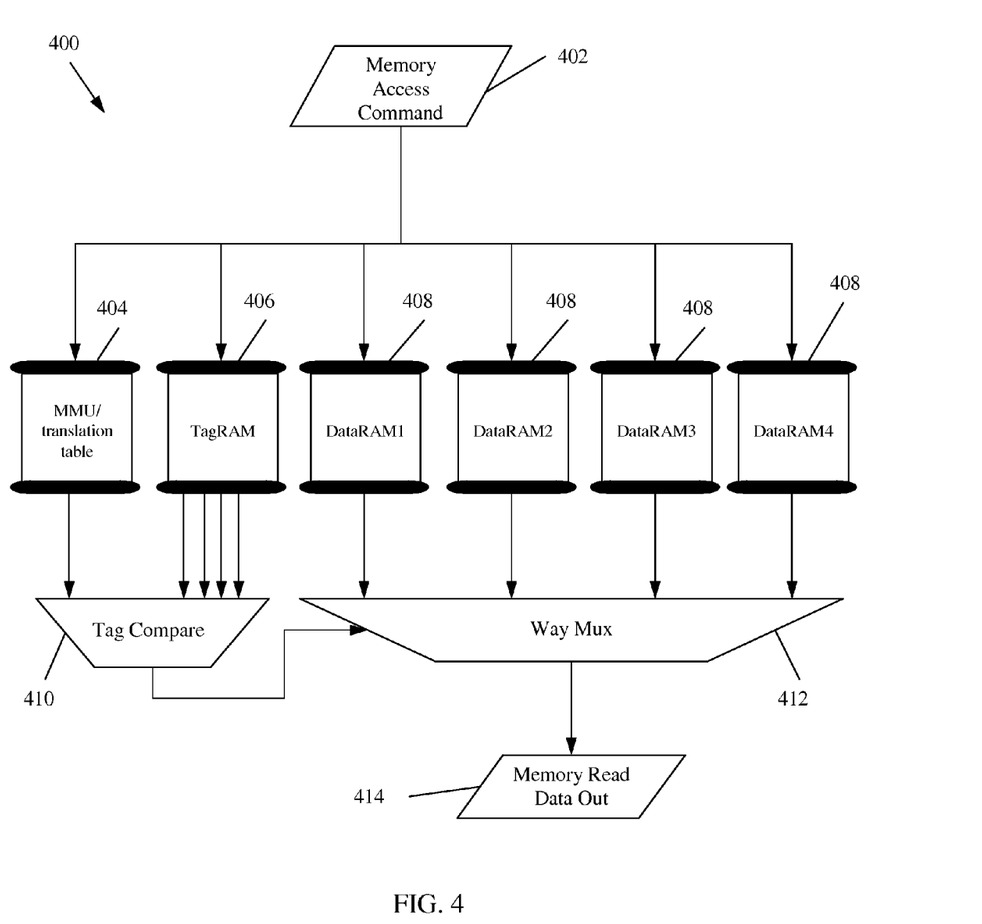
FIG. 4 is a cache block diagram of a RAM memory module with an MMU implemented complete page address table in accordance with a disclosed embodiment.

FIG. 4 is a cache block diagram of a RAM memory module 400 with an MMU-implemented complete page address table in accordance with a disclosed embodiment. The RAM memory module 400 may be implemented as RAM component 140 in FIG. 1. The module 400 may comprise a MMU/translation table 404, a TagRAM 406, and a plurality of DataRAMs 408. The MMU/translation table 404 may be implemented as the MMU 141 and page translation table 142 in FIG. 1. The dataRAMs 408 may be implemented as dataRAM 146 in FIG. 1. The module 400 may also comprise a tag compare unit 410 and a Way multiplexer (Mux) 412. The MMU/translation table 404 may comprise a complete page address table such as, for example, page address table 300 in FIG. 3. The TagRAM may comprise entries indicating in which of the plurality of DataRAMs 408 a data element is stored. The DataRAMs 408 may comprise data and/or instructions for use by a processor. The Tag compare unit 410 may receive inputs from the MMU/translation table 404 and the TagRAM 406 and determine from which of the DataRAMs to retrieve requested data. The Way Mux 412 may be coupled to the output of each of the DataRAMs 408. Way Mux 412 may also be coupled to an output of the Tag compare unit 410. The output of the Tag compare unit 410 may determine which of data from the DataRAMs 408 is output by the Way Mux 412.

The module 400 may be a typical set associative cache subsystem, which may contain the DataRAM portion 408 and the TagRAM complex 406. The DataRAM portion 408 may store the cached memory data. The DataRAM portion 408 may be accessed with only part of the memory address. In an N-way set associate cache system, there may be N set of data coming out of the DataRAM portion 408. Since the DataRAM portion 408 may be accessed with only part of the address, and may have N set of data, the DataRAM portion 408 alone may not determine which data is the correct data according to the full address. In fact, it may be possible that none of the data is. The TagRAM portion 406, therefore, may determine if and which data out of the DataRAM 408 is wanted. The TagRAM portion 408 may be accessed with the same partial address as the DataRAM 406, and may send out N sets of address information. One set of address information may correspond to each data out of the DataRAM 408. Each address information out of the TagRAM 406 may be compared in tag compare 410 with a portion of the full address that is not used in the DataRAM 408 and the tag RAM access 408. If the comparison matches, the correspondent data out of the data RAM 408 is the correct one. If none matches, it means the wanted data is not in the cache yet.

The module 400 which the TagRAM complex 406 managed may receive a memory access command 402 from a processor. The memory access command 402 may comprise a virtual memory address and may comprise a privilege level. The privilege level may indicate whether the application or processor requesting the data is authorized to read and/or modify the data in the DataRAM 408. The MMU/translation table 404 may map the virtual memory address to a physical memory address and output the physical memory address to the tag compare unit 410. The MMU/translation table 404 may also perform page protection of the data in the DataRAM 408 to prevent or deny access to the data if the privilege level of the memory access command 402 is not sufficient (or is below a threshold privilege level) for access to the data in the DataRAM 408. The memory access command 402 may also be transmitted TagRAM complex 406 and to the DataRAMs 408. The TagRAM complex 406 may output a plurality of tags, each corresponding to a different one of the DataRAMs 408. The Tag compare unit 410 may compare the physical memory address with the tags from the TagRAM complex 406 to determine which DataRAM comprises the data requested by the memory access command 402. The output from the Tag compare unit 410 may be used by the Way Mux 412 to determine which of the DataRAMs 408 data to send to the memory read data out 414 which may be sent back to the requesting processor. Because the complete translation table is resident in the RAM (e.g., in the MMU), additional compare units may not be required. However, traditional address translation as illustrated in FIG. 2 may require additional compare units beyond those shown in FIG. 4. Thus, address translation utilizing the disclosed complete page address table implemented in the RAM rather than cached or resident outside the RAM may lower hardware cost and lower latency as compared with traditional address translation methods and schemes.

Figure 5:
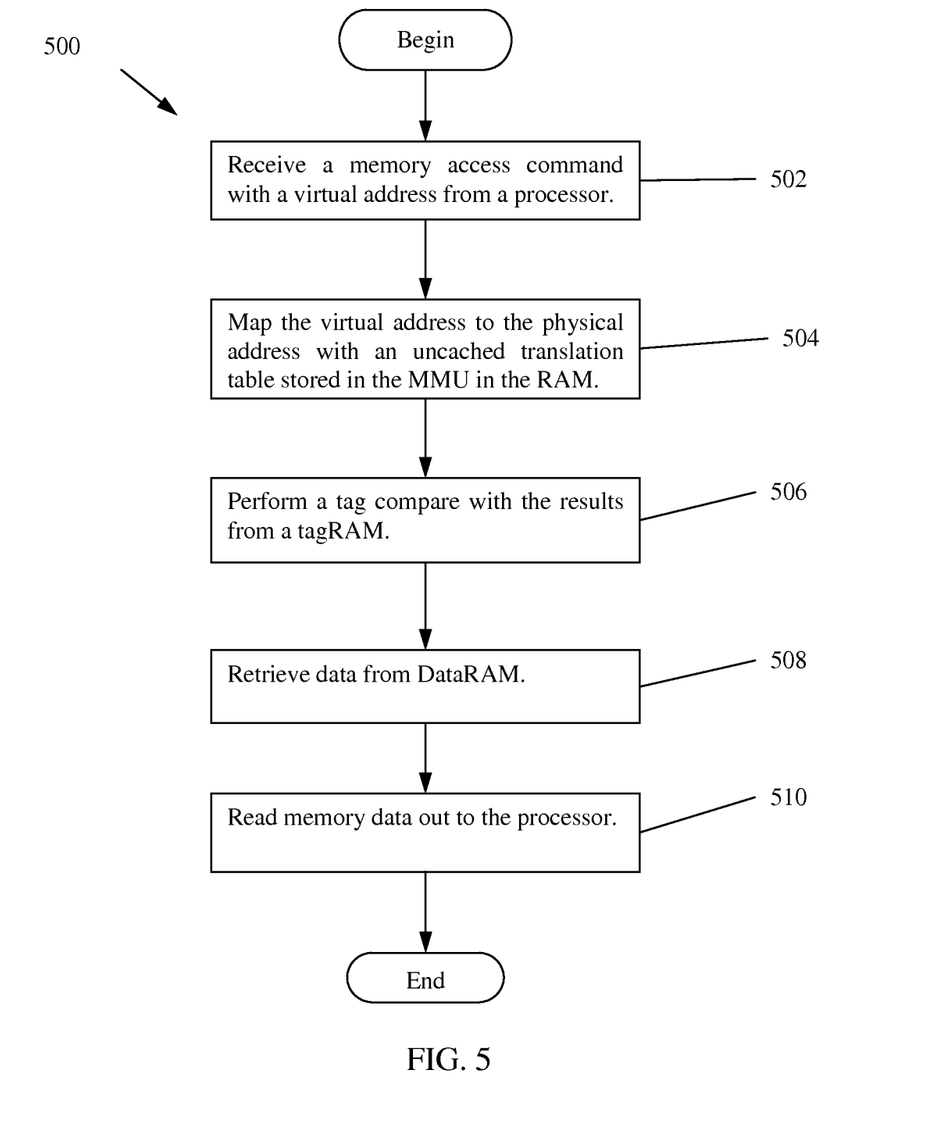
FIG. 5 is a flowchart illustrating a method for retrieving data from a memory in accordance with a disclosed embodiment.

FIG. 5 is a flowchart illustrating a method 500 for retrieving data from a memory in accordance with a disclosed embodiment. The method 500 may begin at block 502 where a MMU 404 may receive a memory access command 402 from a processor. The memory access command 402 may comprise a virtual memory address. At block 504, the MMU 404 may map the virtual address to the physical address utilizing an uncached complete page translation table resident in the MMU 404 or the RAM. At block 506, a tag compare operation comparing the physical address from the MMU with the output from a tagRAM may be performed to determine which of a plurality of dataRAMs 408 comprises the data corresponding to the memory access command 402. At block 508, the data may be retrieved from a DataRAM 408. At block 510, the MMU may read the memory data out 414 to the processor, after which the method 500 may end.

Figure 6:
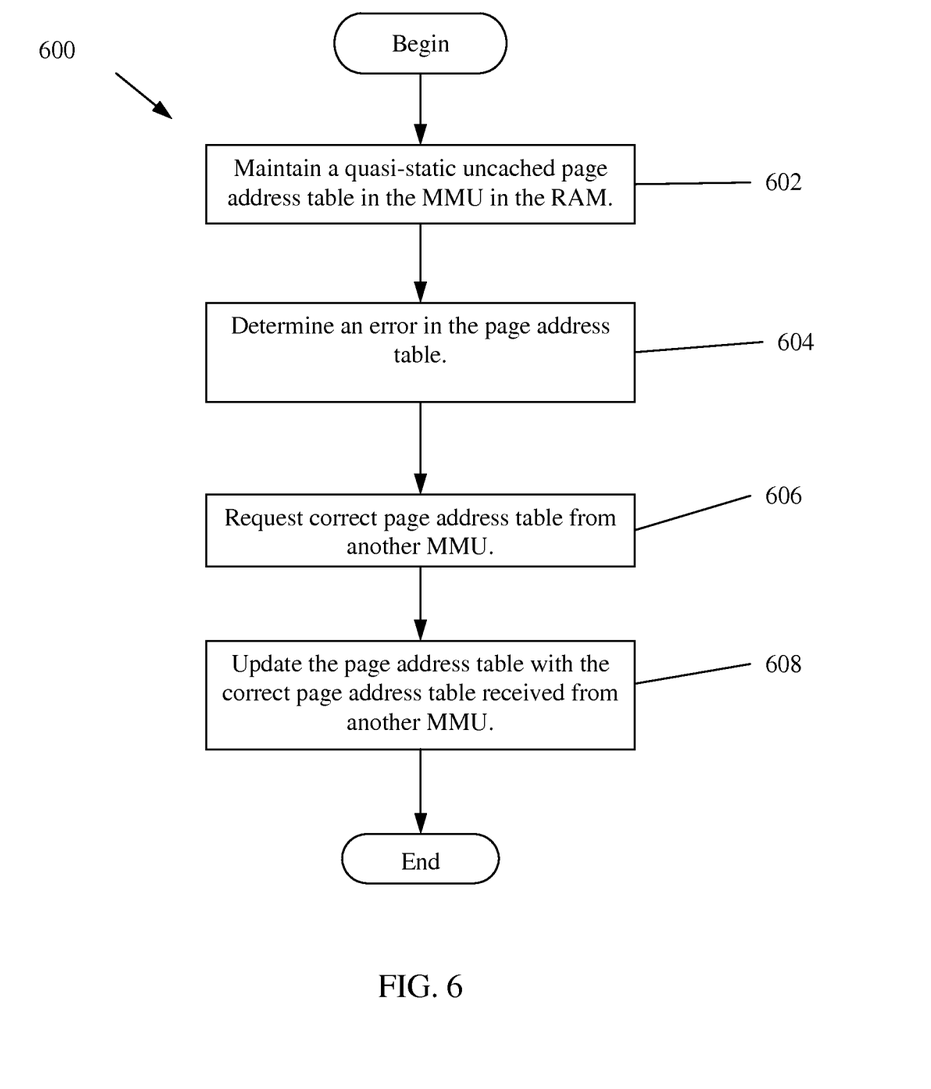
FIG. 6 is a flowchart of a method for maintaining a complete page address table in a RAM according to a disclosed embodiment.

FIG. 6 is a flowchart of a method 600 for maintaining a complete page address table in a RAM according to a disclosed embodiment. The method 600 may begin at block 602 where a MMU 404 may maintain a static or quasi-static uncached complete page address table in a RAM. At block 604, the MMU 404 may determine that there is an error in the page address table. For example, the page address table may have experienced a soft error or may be otherwise corrupted. At block 606, the MMU 404 may request a corrected (i.e., uncorrupted) copy of the page address table from another MMU in the data processing system. At block 608, the MMU 404 may update the page address table with the corrected copy of the page address table obtained from another MMU in the data processing system, after which, the method 600 may end.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. A network unit, comprising:
a random access memory (RAM) component coupled to a processor, wherein the RAM component comprises:
a data RAM; and
a memory management unit (MMU) coupled to the data RAM and configured to:

store a complete page address table comprising a plurality of address mapping entries that map an entire virtual memory address space of the network unit to a physical memory address space of the data RAM, wherein the virtual memory address space is larger than the physical memory address space, and wherein sizes of the address mapping entries are limited based on a size of the RAM component to enable the complete page address table to be stored in the MMU;

receive a virtual memory address from the processor; and translate the virtual memory address into a physical memory address based on the complete page address table by copying at least a highest value bit of the virtual memory address to a highest value bit of the physical memory address.

2. The network unit of claim 1, wherein the address mapping entries correspond to pages of differing sizes.

3. The network unit of claim 1, wherein translating the virtual memory address into the physical memory address comprises mapping a first portion of the virtual memory address into a first portion of the physical memory address based on a corresponding address mapping entry associated with the virtual memory address, and wherein a size of the corresponding address mapping entry limits a number of translatable virtual address bits in the first portion of the virtual memory address.

4. The network unit of claim 3, wherein translating the virtual memory address into the physical memory address further comprises copying a second portion of the virtual memory address to a second portion of the physical memory address.

5. The network unit of claim 1, wherein the complete page address table does not change dynamically in a run-time.

6. The network unit of claim 1, wherein the MMU is further configured to deny a request for data from the data RAM when the request comprises an insufficient privilege level.

7. The network unit of claim 1, wherein the MMU is further configured to obtain a corrected copy of the complete page address table from another MMU when the MMU determines that the complete page address table is corrupted.

8. The network unit of claim 1, further comprising the processor, wherein the processor is configured to execute a job associated with the virtual memory address, and wherein the complete page address table is static when the processor first executes the job.

9. The network unit of claim 1, wherein the MMU does not comprise a translation lookaside buffer.

10. A method for reading data from a random access memory (RAM) in a data processing system, comprising:
receiving, at a memory management unit (MMU), a memory access command from a processor, wherein the memory access command comprises a virtual memory address associated with the data to be read, wherein the virtual memory address is in a virtual memory address space of the data processing system;
translating, at the MMU, at least a first portion of the virtual memory address into a first portion of a physical memory address in a physical memory address space of the RAM by consulting a complete address translation table stored in the RAM; and
copying at least a highest value bit of the virtual memory address to a highest value bit of the physical memory address,
wherein the complete address translation table comprises a plurality of address mapping entries that map the virtual memory address space of the data processing system into the physical memory address space of the RAM,
wherein the virtual memory address space is larger than the physical memory address space,
wherein sizes of the address mapping entries are limited based on a size of the RAM to enable the complete address translation table to be stored in the RAM, and
wherein a bit width of the first portion translated by the MMU is limited by a size of an address mapping entry that is associated with the virtual memory address.

11. The method of claim 10, wherein at least two of the entries in the complete address translation table correspond to pages of differing sizes.

12. The method of claim 10, wherein the memory access command comprises a privilege level, and wherein the method further comprises refraining from providing the data requested by the memory access command when the privilege level is lower than a threshold for the requested data.

13. The method of claim 10, further comprising:
requesting a correct copy of the complete address translation table from another MMU when the MMU determines that the complete address translation table is corrupted;
receiving the correct copy of the complete address translation table from the other MMU; and
storing the correct copy of the complete address translation table in the RAM.

14. The method of claim 10, wherein the complete address translation table is static irrespective of an order of virtual memory addresses received from the processor.

15. The method of claim 10, wherein the MMU does not comprise a translation lookaside buffer.

16. The method of claim 10, wherein the complete address translation table does not change dynamically in a run-time when the MMU is consulting the complete address translation table.

17. A random access memory (RAM) component in a data processing system, comprising:
a complete chapter address table comprising a plurality of address mapping entries that maps an entire virtual memory address space of the data processing system network unit to a physical memory address space, wherein the virtual memory address space is larger than the physical memory address space, and wherein sizes of the address mapping entries are limited based on a size of the RAM component to enable the complete page address table to be included in the RAM component; and
a memory management unit (MMU) coupled to the complete chapter address table and configured to translate a virtual memory address into a physical memory address by consulting the complete chapter address table,
wherein V is a positive integer representing a total number of bits in the virtual memory address and the physical memory address, wherein the virtual memory address is represented by Virtual_Address[V-1:0], wherein the physical memory address is represented by Physical_Address[V-1:0], and wherein the MMU is configured to translate the virtual memory address into the physical memory address by:
translating a first portion of the virtual memory address, denoted as Virtual_Address[U:W], to a first portion of the physical memory address, denoted as Physical_Address[U:W] based on a first of the address mapping entries associated with the virtual memory address, wherein W>U>V-1 and W>0, and wherein a size of the first address mapping entry limits a bit width of U-W;

copying a second portion of the virtual memory address, denoted as Virtual_Address[W-1:0], to a second portion of the physical memory address, denoted as Physical_Address[W-1:0]; and copying a third portion of the virtual memory address, denoted as Virtual_Address[V-1:U+1], to a third portion of the physical memory address, denoted as Physical_Address[V-1:U+1].

18. The RAM component of claim 17, wherein the MMU is further configured to translate the virtual memory address into the physical memory address without consulting a page address table resident outside the RAM component.

19. The RAM component of claim 17, wherein a first entry in the complete chapter address table corresponds to a first page and a second entry in the complete chapter address table corresponds to a second page, and wherein a size of the first page is different from a size of the second page.

20. The RAM component of claim 17, wherein the MMU does not comprise a translation lookaside buffer.

21. The RAM component of claim 17, wherein the MMU is further configured to obtain a corrected copy of the complete chapter address table from another MMU when the MMU determines that the complete chapter address table is corrupted.

22. The RAM component of claim 17, wherein the MMU is further configured to synchronize with another MMU at a pre-determined time to update the complete chapter address table.

* * * * *